Dec. 6, 1949     A. DREYER     2,490,513
CORRUGATED TUBE
Filed March 30, 1948
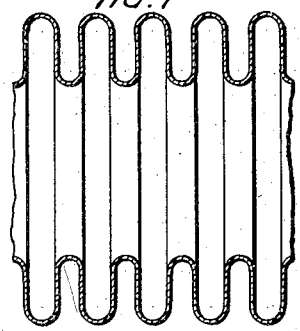
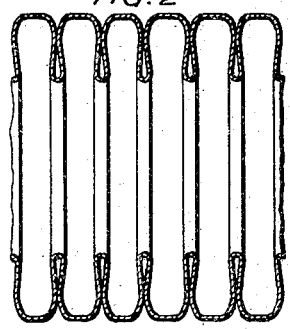
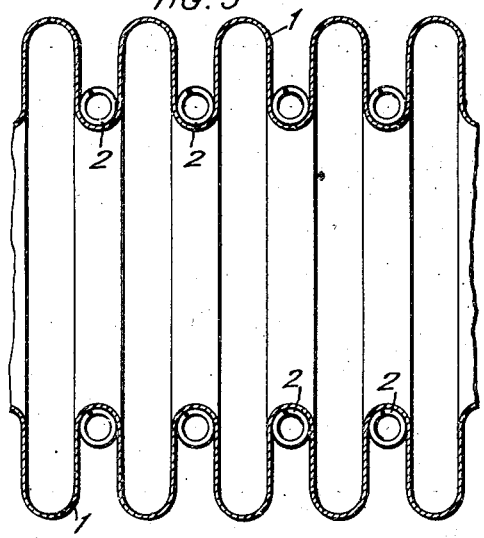
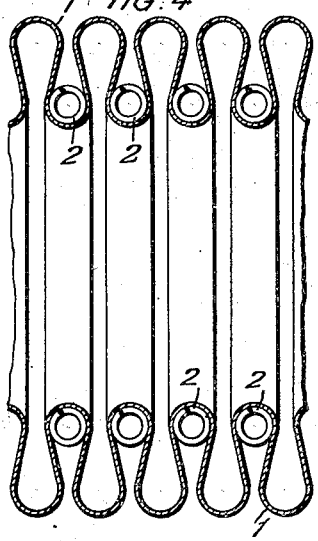
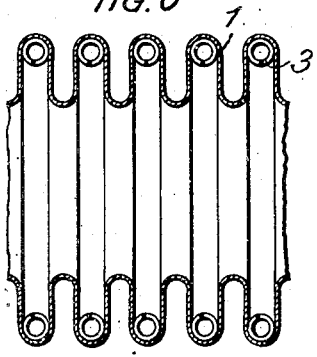
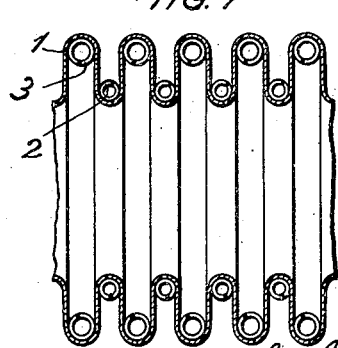
Inventor:
Albert Dreyer
by Sommers + Young
Attorneys

Patented Dec. 6, 1949

2,490,513

UNITED STATES PATENT OFFICE 2,490,513

CORRUGATED TUBE

Albert Dreyer, Lucerne, Switzerland, assignor to Metallschlauchfabrik A. G., Lucerne, Switzerland Application March 30, 1948, Serial No. 17,943
In Switzerland April 15, 1947

1 Claim. (Cl. 138—56)

My present invention relates to improvements in corrugated tubes having parallel folds or corrugations.

Corrugated tubes, as known in the art, possess a relatively thin wall for the purpose of attaining a good resilience. For high inside or outside pressures, the corrugated tube mostly is made with plural walls, thus affording a considerably greater resilience than a single-wall corrugated tube of like wall-thickness. Even in a multi-wall corrugated tube, however, the folds or corrugations are deformed under a high inside pressure, in that the bottoms of the corrugations are upset from their normal shape (Fig. 1) into the form shown in Fig. 2. Such upsetting at the same time causes a widening of the corrugation-crest, which—as shown in Fig. 2—may reach such an extent that there will be no more clearance between the corrugations and the latter will abut against each other. The corrugated tube thereby loses its resilience. Various means have been proposed with a view of preventing such upsetting of the corrugation-bottoms or, respectively, to permit of using the corrugated tubes also for high inside or outside pressures. Bolted reinforcing-rings made in two sections, have been used, e. g., which are embedded into the corrugations. Such rings, however, only are suited for corrugated tubes of very large dimensions. The resilience of the corrugated tube is substantially curtailed by the said rings, since the latter filled up the entire depth of the corrugation-bottoms. Further, it has been proposed to employ endless reinforcing-tapes which are rolled into the corrugation-bottoms during the manufacture of the tube. Such tapes, however, only are suited when the corrugated tube is made from a smooth tube exclusively by rolling. Such latter manufacturing method, however, has not proved suitable since the corrugation-bottoms are excessively hardened by the great number of rolling-operations required, which in service will lead to a premature fatigue. Corrugated-tubes with corrugations produced exclusively to the outside or partly to the outside and only partially to the inside, have proved much better in operation. Further, resilient rings made of round wire, also have been used, which are slid into place in a corrugation over the corrugation-crests in the manner of a piston ring. Such wire rings also only are suited for corrugated tubes of large diameter or else of abnormally shallow corrugation. In corrugated tubes of smaller diameter and conventional corrugation-depth, the spring wire ring has to be sprung open excessively when sliding same over the corrugations, and, therefore, is stressed beyond its elastic limit so that it will not regain its original form. The ends of the spring wire ring then are ajar, and the wire ring is loose in the corrugation-bottom instead of hugging same tightly.

In accord with my present invention, each of the reinforcing-rings inserted into each corrugation of the tube consists of a coiled spring bent into annular form, the ends of each spring being interconnected. Such spring may be made of thin wire and easily is slipped over the corrugated tube. The resistance of such a coiled spring against lateral pressure is very high.

The ends of the coiled-spring rings suitably are interconnected by spreading their turns apart at the two ends and screwing these end turns into each other.

In the drawing,

Figs. 3-7 show three examples of my invention:

Fig. 3 is a partial longitudinal section of a corrugated-tube having coiled tension-spring rings, Fig. 4 a similar section of the axially compressed corrugated tube, Fig. 5 illustrates a coiled tension spring, constituting a reinforcing-ring, the ends of which are ready for being screwed into each other, Fig. 6 is a partial longitudinal section of a corrugated tube comprising coiled compression-spring rings in the corrugation crests, and Fig. 7 a similar section of a corrugated tube comprising coiled springs inserted into each corrugation bottom and crest.

In the example shown in Figs. 3 and 4, a coiled tension-spring 2 in ring form is inserted into each corrugation of the tube 1 which in operation is subject to high pressure. The ends of each ring 2 are interconnected. The rings 2 are cut from a continuous spring, the diameter of which corresponds to the width of the corrugation-bottom. A relatively thin, round or square spring-steel wire may be used for manufacturing the said continuous spring. The turns of the latter are coiled in full abutment. After cutting off proper lengths from the said continuous spring for the rings 2, the ends of the latter are spread, e. g. by means of a knife or a suitable calibrating-tool and on a length of approximately 10-20 mm., so that the pitch of the wire coil at the spring ends is about doubled, as seen in Fig. 5. One end of the ring then is held stationary and the other end turned back by a few turns, whereupon the two ends are nested into each other and released. The ends thus are screwed into each other and interengaged. In this way, an endless coil ring is produced which may be easily slipped over the corrugated tube and inserted into a corrugation bottom. Where the length of the annular coiled tension-spring 2 is correctly chosen, the ring is subject to a slight tension in the corrugation-bottom and, thus, snugly fits same.

The resistance of such a coiled ring 2 against lateral compressive forces is very great. A corrugated tube of 100 mm. clear width in conventional triple-wall construction and having a spring insert of the kind described in form of a tension-spring of 0.5 mm. gauge and 3 mm. outside diameter, may safely withstand an inside operating-pressure of 100 atm., whereas the same corrugated tube without such insert is upset under an inside pressure of 35-40 atm.

The coiled springs may be made in very great lengths, and cut off in the desired lengths. Such a spring weighs less than a solid wire, and, if desired, may be demounted from the tube at any time and be used, eventually, for a new corrugated tube. The coiled tension-spring may be made of a non-corroding wire such as stainless steel, instead of the conventional spring-steel wire. In the case of corrugated tubes of large diameter and correspondingly wider corrugation-bottom, suitably a thicker wire is used for the manufacture of the coiled tension-spring.

As seen from Fig. 6, an annular coiled compression spring 3 which has its ends interconnected, may be inserted into the inside trough of each corrugation-crest, when the corrugated tube 1 is subject to a high outside pressure. Such spring 3 is coiled so that its turns not quite abut against each other, and the springs 3, therefore, may be slightly compressed for the purpose of lodging same in the inside trough of the corrugation-crests so that subsequently the coiled spring rings 3 will abut against the sides of the said troughs.

When the corrugated tube is intended for a high inside as well as a high outside pressure, coiled tension-spring rings 2 may be inserted into the corrugation-bottoms, and coiled compression-spring rings 3 into the corrugation-crests.

What I claim as new and desire to secure by Letters Patent is:

A corrugated tube comprising parallel folds or corrugations, and reinforcing-rings in form of coiled spring rings of which the appurtenant ends are interlocked, the said rings being inserted into the said folds or corrugations with a view of strengthening the tube against high pressures acting thereon and of preventing an upsetting thereof.

ALBERT DREYER.

REFERENCES CITED

The following references are of record in the file of this patent:

FOREIGN PATENTS

| Number | Country | Date |
|---|---|---|
| 27,864 | Great Britain | Dec. 17, 1902 |
| 21,700 | Great Britain | Oct. 4, 1908 |